US008467421B2

(12) United States Patent
Larmo et al.

(10) Patent No.: US 8,467,421 B2
(45) Date of Patent: Jun. 18, 2013

(54) MAC-D MULTIPLEXING IN UTRAN HSDPA WIRELESS NETWORKS

(75) Inventors: Anna Larmo, Helsinki (FI); Stefan Henrik Wager, Espoo (FI); Janne Peisa, Espoo (FI); Per Johan Torsner, Masaby (FI); Mats Fredrik Sågfors, Kyrkslätt (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 857 days.

(21) Appl. No.: 12/519,333

(22) PCT Filed: Dec. 14, 2007

(86) PCT No.: PCT/SE2007/050996
§ 371 (c)(1),
(2), (4) Date: Jun. 15, 2009

(87) PCT Pub. No.: WO2008/073050
PCT Pub. Date: Jun. 19, 2008

(65) Prior Publication Data
US 2010/0080170 A1    Apr. 1, 2010

(30) Foreign Application Priority Data
Dec. 15, 2006 (SE) ......................... 0602746

(51) Int. Cl.
*H04J 3/04* (2006.01)
(52) U.S. Cl.
USPC ............ 370/535; 370/329; 370/466; 370/537
(58) Field of Classification Search
USPC ................. 370/328, 329, 349, 466, 469, 473, 370/535, 537
See application file for complete search history.

(56) References Cited

U.S. PATENT DOCUMENTS

| 6,850,540 B1 * | 2/2005 | Peisa et al. ................. 370/468 |
| 7,551,596 B2 * | 6/2009 | Kim et al. .................. 370/349 |

(Continued)

FOREIGN PATENT DOCUMENTS

| JP | 2005237013 A | 9/2005 |
| RU | 2280951 C2 | 7/2006 |
| WO | 2006110072 A1 | 10/2006 |

OTHER PUBLICATIONS

3rd Generation Partnership Project. "Grouping of Logical Channels to Priority Queues." 3GPP RSG-RAN WG2#56bis, Tdoc R2-07407, Sorrento, Italy, Jan. 15-19, 2007.
3rd Generation Partnership Project. "MAC Header for Improved L2 Support for High Data Rates." 3GPP TSG-RAN WG2#57, Tdoc R2-070810, St. Louis, USA, Feb. 12-16, 2007.

(Continued)

*Primary Examiner* — Kwang B Yao
*Assistant Examiner* — Nguyen Ngo
(74) *Attorney, Agent, or Firm* — Coats & Bennett, P.L.L.C.

(57) ABSTRACT

UTRAN MAC-d multiplexing of data from multiple logical channels to a single MAC-d flow is supported while reducing overhead and achieving octet alignment in MAC-d PDU length. In one embodiment, the C/T field of a multiplexed MAC-d PDU is eliminated, and the logical channels multiplexed into the MAC-d flow are mapped to a MAC-hs PQ in at least the NodeB (and preferably in the UE as well). In other embodiments, the C/T field is retained, and an octet-aligned length indicator is transmitted from the RNC to the UE. In one embodiment, the length indicator is octet-aligned by padding the MAC-d PDUs. In another embodiment, transmitters and receivers in the path from RNC to UE are configured with an offset to add to the length indicator to achieve octet alignment. The padding or offset is (8−n) bits, where n=the number of bits in C/T field.

20 Claims, 6 Drawing Sheets

U.S. PATENT DOCUMENTS

| | | | |
|---|---|---|---|
| 8,189,615 B2* | 5/2012 | Malkamaki et al. | 370/465 |
| 2004/0156330 A1 | 8/2004 | Yi et al. | |
| 2005/0135426 A1 | 6/2005 | Francoeur et al. | |
| 2005/0185608 A1* | 8/2005 | Lee et al. | 370/328 |
| 2005/0270996 A1 | 12/2005 | Yi et al. | |
| 2006/0007886 A1 | 1/2006 | Lee et al. | |
| 2006/0251027 A1* | 11/2006 | Chun et al. | 370/335 |
| 2007/0233721 A1* | 10/2007 | Bazar | 707/101 |
| 2008/0089285 A1* | 4/2008 | Pirskanen et al. | 370/329 |
| 2009/0141678 A1* | 6/2009 | Sun et al. | 370/329 |
| 2009/0221292 A1* | 9/2009 | Lundh et al. | 455/445 |
| 2010/0226316 A1* | 9/2010 | Terry et al. | 370/328 |
| 2011/0205945 A1* | 8/2011 | Cave et al. | 370/310 |

OTHER PUBLICATIONS

ETSI, Universal Mobile Telecommunications System (UMTS); Medium Access Control (MAC) protocol specification, (3GPP TS 25.321 version 6.5.0 Release 6), ETSI TS 125 321 V6.5.0, Jun. 2005, pp. 1-85, Sophia-Antipolis Cedex, Fr.

ETSI, Universal Mobile Telecommunications System (UMTS); Medium Access Control (MAC) protocol specification, (3GPP TS 25.321 version 6.10.0 Release 6), ETSI TS 125 321 V6.10.0, Sep. 2006, pp. 1-94, Sophia-Antipolis Cedex, Fr.

3GPP. "MAC architecture for LTE" 3GPP TSG-RAN2 Meeting #51. Denver, CO, Feb. 13-17, 2006. R2-060512.

* cited by examiner

MAC-D MULTIPLEXING IN UTRAN HSDPA WIRELESS NETWORKS

FIELD OF THE INVENTION

The present invention relates generally to wireless communications, and in particular to efficient support of MAC-d multiplexing in UTRAN HSDPA.

BACKGROUND

The present invention relates to downlink data transfer in a UMTS terrestrial radio access network (UTRAN). A UTRAN wireless communication network 10 is depicted in FIG. 1. The UTRAN network comprises a Core Network (CN) 12, a plurality of Radio Network Controllers (RNC) 14, and plurality of NodeBs 20, also known in the art as Base Stations, each providing communication services to one or more User Equipment (UE) 24, also known as mobile stations, across an air interface within a cell or sector 26.

The CN 12 may be communicatively coupled to other networks such as the Public Switched Telephone Network (PSTN), the Internet, a GSM network, or the like. Each RNC 14 includes, among other functional modules, a Radio Link Protocol (RLC) 16 and a dedicated Medium Access Control (MAC-d) 18. The RLC 16 transfers data to the MAC-d 18 on a plurality of logical channels 17. With the advent of High-Speed Downlink Packet Access (HSDPA), the NodeB 20 communicates with each UE 24 on dedicated channels and additionally broadcasts data packets throughout the cell 26 on a High Speed Downlink Shared Channel (HS-DSCH).

HSDPA utilizes channel-dependent scheduling, whereby data directed to each UE 24 is scheduled for transmission on the shared channel when the instantaneous channel quality to that UE 24 is high. Similarly, fast rate control and higher order modulation are used for link adaptation, wherein the data rate of each transport block and the modulation scheme are varied in response to channel conditions to the target UE 24 (and the capability of the UE 24). In addition, HSDPA employs a hybrid-ARQ (HARQ) acknowledgement scheme, wherein soft values of unsuccessfully decoded transport blocks are retained and combined with the soft decoding results of each retransmission. This allows for incremental redundancy, reducing the need for further retransmissions. Because the scheduling, rate adaptation, and HARQ functions must be close to the radio interface on the network side, a high speed Medium Access Control (MAC-hs) function 22 is added to the NodeB 20. A MAC-ehs function (not shown) is additionally provided in UE 24 capable of receiving HSDPA traffic.

The $3^{rd}$ Generation Partnership Project (3GPP) standard defines MAC-d multiplexing, whereby data from a plurality of logical channels may be multiplexed into one MAC-d flow and encapsulated into MAC-d Protocol Data Units (PDUs). This functionality was developed for Release-99 channels, when priority-based scheduling on transport channels was performed entirely in the RNC 14. To distinguish the logical channel, a 4-bit C/T field is added to a multiplexed MAC-d PDU header (non-multiplexed PDUs need not include the C/T field). The logical channels that are MAC-d multiplexed in the RNC 14 are handled as one MAC-d flow through the Transport Network (i.e., between the RNC 14 and the NodeB 20 over the Iub) and, typically, as one priority flow (or queue) over the air interface. This enables data from a number of Radio Bearers (RB) to be transmitted over a single MAC-d flow, reducing the number of Priority Queues (PQs) in the NodeB. Additionally, with fewer MAC-d flows, the number of transport network links is reduced, which may alleviate address space constraints in UE 24 having limited MAC-d flow capacity.

The multiplexing MAC-d functionality is depicted in FIG. 2. A C/T multiplexer 28 multiplexes data from a plurality of logical channels into one MAC-d flow. The C/T MUX Priority Controller 30 only performs priority setting for the downlink if the C/T mux 28 is removed. FIG. 3 depicts the mapping of MAC-d flows into PQs 32 in the MAC-hs 22 in the NodeB 20. The reordering of PDUs in MAC-hs functionality in the UE 24 is depicted in FIG. 4. The reordering is performed on a per-PQ 32 basis; thus the UE 24 must configure as many reordering queues 34 as there are PQs 32.

The above-described system is deficient in several respects. First, the MAC-d PDU is ideally octet-aligned. The MAC-d receives RLC PDUs, which are octet-aligned in both acknowledged mode (AM) and unacknowledged mode (UM). However, by adding a 4-bit C/T field to the header, the MAC-d PDUs are no longer octet-aligned. This is problematic for the design of new headers, such as for encapsulating the data in lower network protocol layers, as many headers include a length indicator (LI) indicating the size of the MAC-d PDU. Non-octet alignment means more bits are required for the LI. Non-octet-aligned protocol structures also require more processing.

Second, the multiplexing with the C/T field generates unnecessary overhead, reducing the effective bandwidth of the air interface. A multiplexed MAC-d PDU header includes a 4-bit C/T field indicating a logical channel associated with the data. The MAC-hs later adds and additional 3-bit field indicating the PQ from which a MAC-d PDU is taken for transmission over the air interface. Accordingly, a total of seven bits are used to indicate the logical channel origin of the MAC-d PDU, when only four or five bits are actually needed.

Removal of the C/T field from the header of a multiplexed MAC-d PDU would alleviate both deficiencies. A straightforward solution for then identifying the logical channel origin of the data would be to assign a one-to-one mapping between logical channels and PQs 32, and perform reordering in the UE 24 on a per-logical channel basis. However, this would result in a proliferation of separated MAC-d flows and PQs 32, increasing processing demands in both the NodeB 20 and UE 24. It would also radically alter the multiplexing structure of the MAC by removing the concepts of MAC-d flows and PQs 32. Accordingly, a need exists in the art to maintain the multiplexing structure defined in the MAC but remove or mitigate the deleterious effects of the C/T field, while maintaining the ability to implement a low number of MAC-d flows and PQs 32.

SUMMARY

According to one or more embodiments disclosed and claimed herein, the number of MAC-d flows and PQs is conserved by multiplexing data from multiple logical channels, while framing overhead and non-octet-alignment processing is reduced. In one embodiment, the C/T field of a multiplexed MAC-d PDU is eliminated, and the logical channels multiplexed into the MAC-d flow are mapped to a MAC-hs PQ in at least the NodeB (and preferably a MAC-ehs in the UE as well). In other embodiments, the C/T field is retained, and an octet-aligned length indicator is transmitted from the RNC to the UE. In one embodiment, the length indicator is octet-aligned by padding the MAC-d PDUs. In another embodiment, transmitters and receivers in the path from RNC to UE are configured with an offset to add to the length indicator to achieve octet alignment. The padding or offset is (8−n) bits, where n=the number of bits in C/T field.

One embodiment relates to a method of transmitting data in a UTRAN wireless communication network without C/T fields. Data are received from two or more radio bearers on two or more respective logical channels at a MAC-d. The data from two or more logical channels are multiplexed into a single MAC-d flow. The multiplexed MAC-d flow is encapsulated into MAC-d PDUs without a C/T field identifying the logical channels in MAC-d PDU headers. Two or more logical channels are mapped to a PQ in a MAC-hs. A logical channel identifier is transmitted from a RNC to a UE.

Other embodiments relate to a method of transmitting data in a UTRAN wireless communication network with C/T fields. Data are received from two or more radio bearers on two or more respective logical channels at a MAC-d. The data from two or more logical channels are multiplexing into a single MAC-d flow. The multiplexed MAC-d flow is encapsulated into MAC-d PDUs. A C/T field is included in MAC-d PDU headers identifying the logical channels. A length indicator is added to MAC-hs and Iub framing protocols identifying an octet aligned length of a MAC-d PDU. In one embodiment, the length indicator is octet-aligned by padding multiplexed MAC-d PDUs with (8−n) bits, where n=the number of bits in the C/T field. In another embodiment, a transmitter and receiver are configured with an offset of (8−n) bits such that the LI adjusted by the offset is octet-aligned, where n=the number of bits in C/T field.

Another embodiment relates to a wireless communication network. The network includes a RNC including a MAC-d operative to receive data from two or more radio bearers on two or more respective logical channels, multiplex the data from two or more logical channels into a single MAC-d flow, and encapsulate the multiplexed MAC-d flow into MAC-d PDUs without a C/T field identifying the logical channels in MAC-d PDU headers. The network also includes a NodeB including a MAC-hs operative to direct MAC-d flows to one or more PQs, wherein two or more logical channels are mapped to at least one PQ. The RNC transmits a logical channel identifier with the multiplexed MAC-d flows to UE.

Other embodiments relate to a wireless communication network. The network includes a RNC including a MAC-d operative to receive data from two or more radio bearers on two or more respective logical channels, multiplex the data from two or more logical channels into a single MAC-d flow, encapsulate the multiplexed MAC-d flow into MAC-d PDUs including a C/T field identifying the logical channels in MAC-d PDU headers, and transmit the MAC-d PDUs and an octet-aligned length indicator to a NodeB. The network also includes a NodeB operative to receive the MAC-d PDUs and the octet-aligned length indicator, and operative to encapsulate the MAC-d PDUs into MAC-hs PDUs including the octet-aligned length indicator in a Priority Queue Identifier (PQID) field of the MAC-hs PDUs. In one embodiment, the MAC-d is further operative to pad multiplexed MAC-d PDUs with (8−n) bits to octet-align the MAC-d PDU length, where n=the number of bits in the C/T field. In another embodiment, the RNC and NodeB are configured with an offset of (8−n) bits such that the length indicator adjusted by the offset is octet-aligned, where n=the number of bits in the C/T field.

Other objects, advantages and novel features of the invention will become apparent from the following detailed description of the invention when considered in conjunction with the accompanying drawings and claims.

BRIEF DESCRIPTION OF THE DRAWINGS

For a better understanding, reference is made to the following drawings and preferred embodiments of the invention.

DETAILED DESCRIPTION

Figure 1:
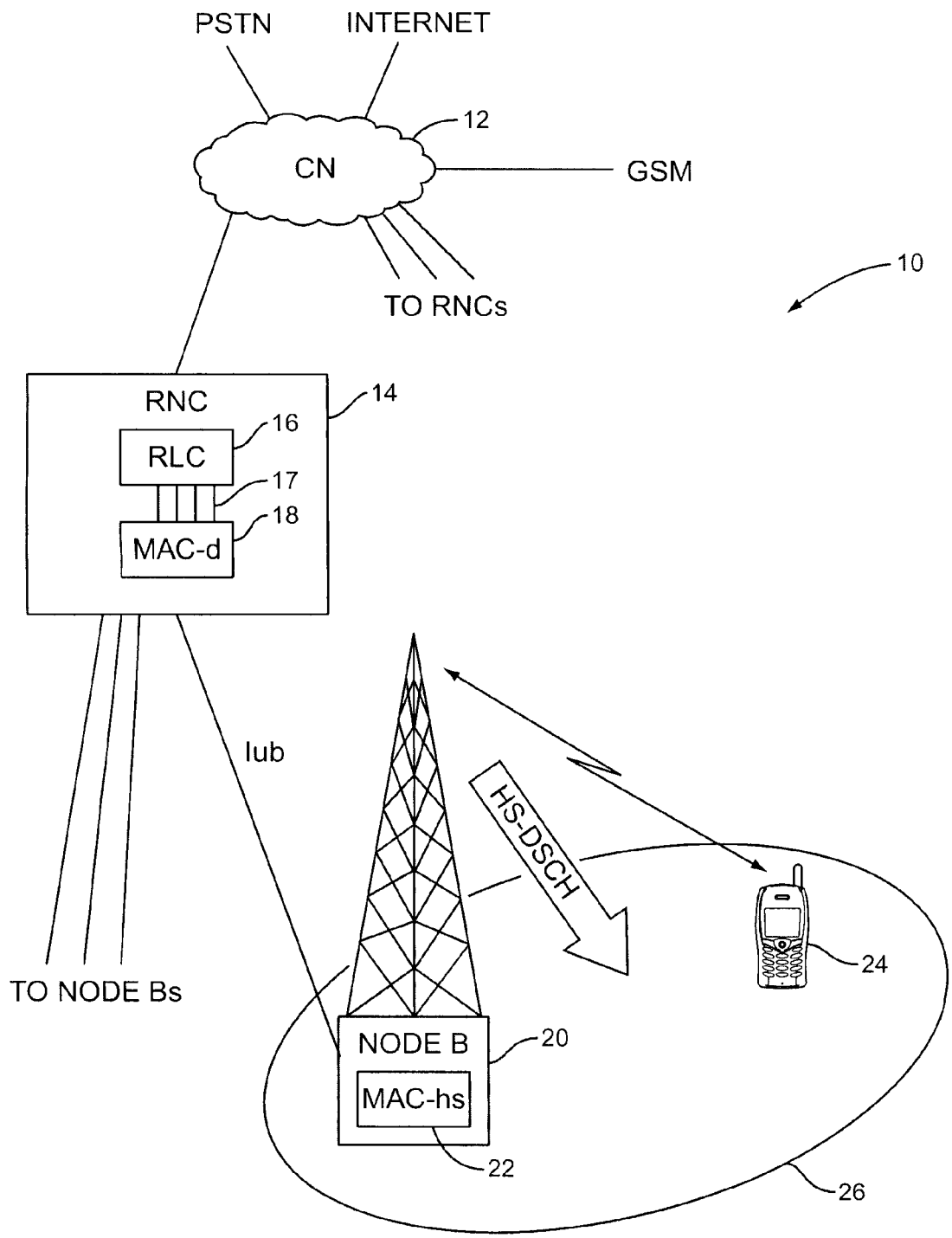
FIG. 1 is a functional block diagram of a UTRAN wireless communication network.
Figure 2:
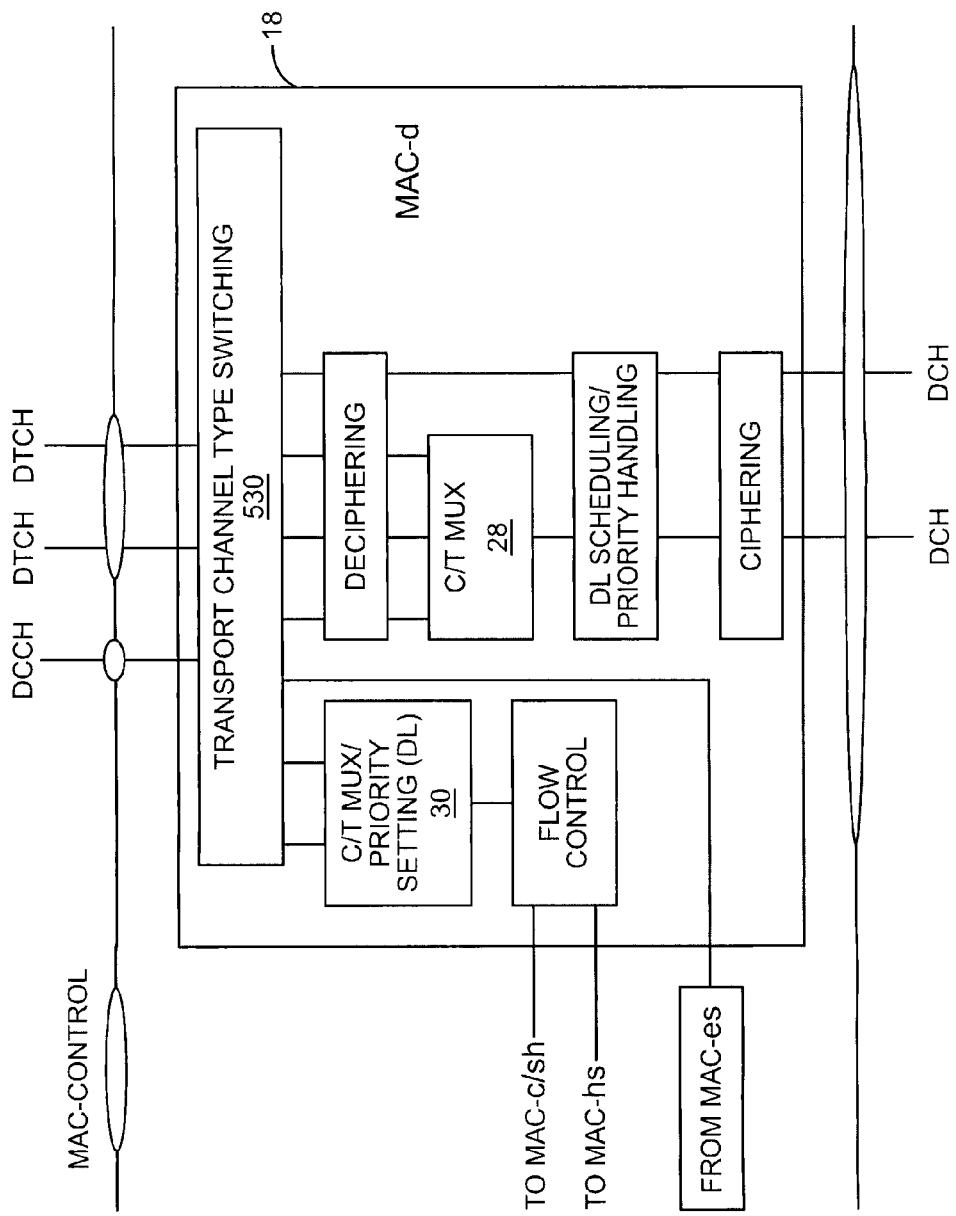
FIG. 2 is a functional block diagram of a MAC-d functional module in a RNC.
Figure 3:
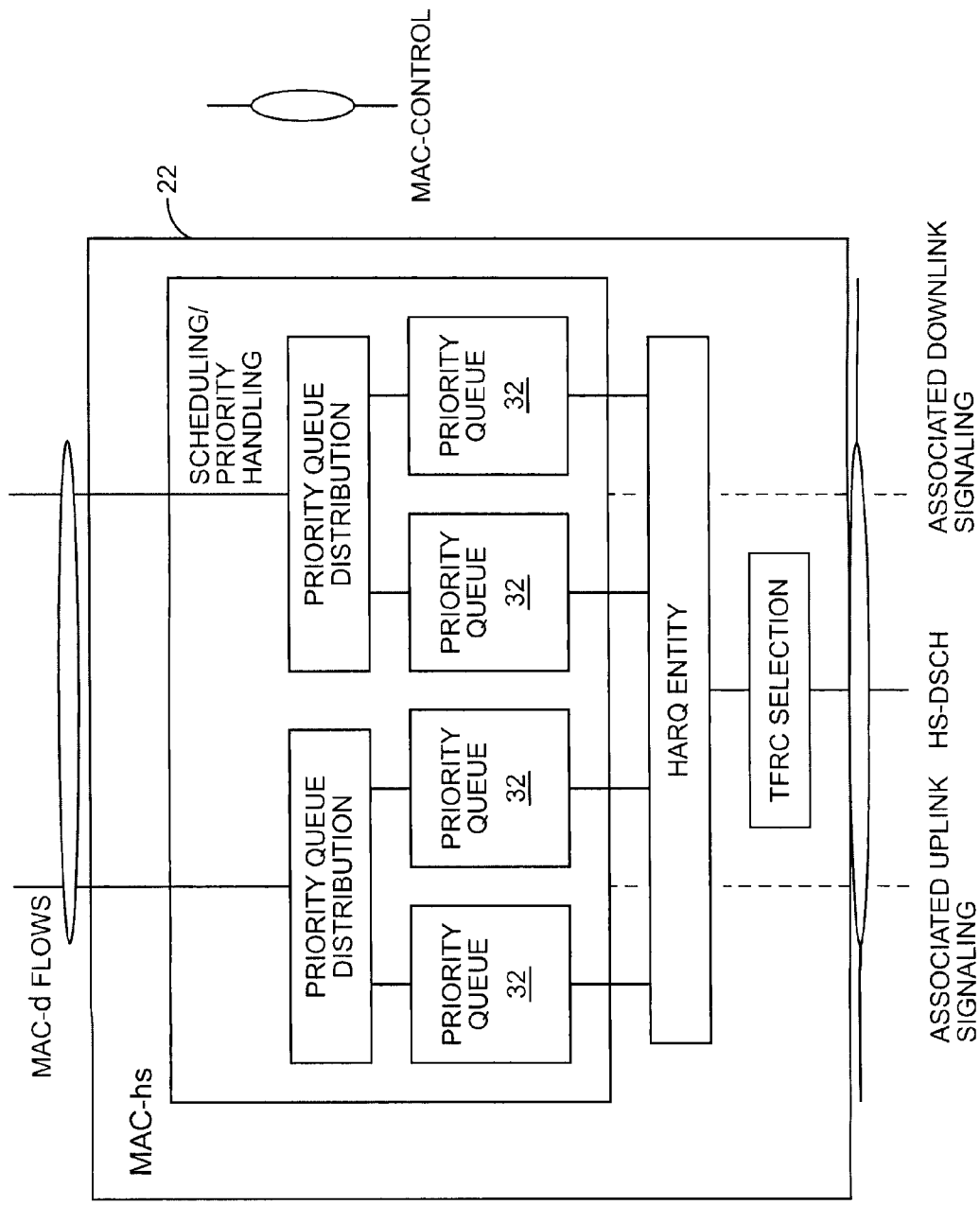
FIG. 3 is a functional block diagram of a MAC-hs functional module in a NodeB.
Figure 4:
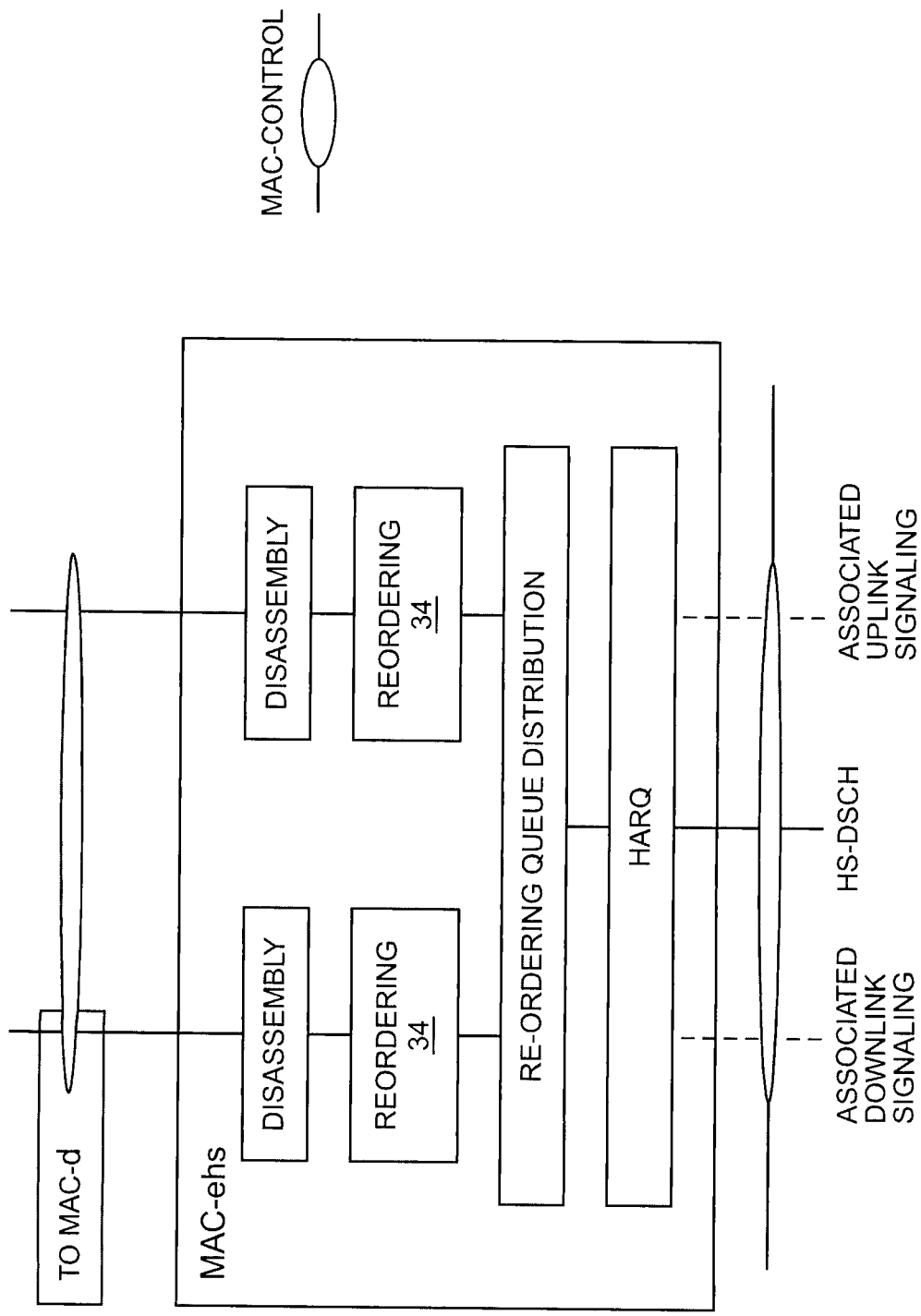
FIG. 4 is a functional block diagram of a MAC-ehs functional module in UE.

Embodiments of the present invention are described herein with reference to any non-limiting example. Consider a UE configured with five (5) logical channels. Four channels carry data from signaling radio beacons (SRBs), indexed 0, 1, 2, and 3. Logical channel ID (LCH-ID) 4 is carrying "best effort" data. The SRBs are, according to existing art, MAC-d multiplexed, meaning that the MAC-d PDUs will be non-octet aligned for this first MAC-d flow. PDUs in the second MAC-d flow carrying LCH-ID 4 have no C/T field and are therefore octet aligned. The prior art would therefore result in two MAC-d flows that would typically be mapped onto two separate priority queues, e.g., PQ 0 and PQ 1. The length indicator in the Iub framing protocol and MAC-hs cannot be quantified in bytes.

According to one embodiment of the present invention, multiple LCH-IDs (here, 0, 1, 2, and 3) are mapped onto one MAC-d flow. MAC-d multiplexing is implemented without a C/T field in the MAC-d PDU headers. The LCH-ID is made available in the frame protocol responsible for transporting the MAC-d PDUs from the RNC to the Node B, e.g., the Iub. Multiple Logical Channels (0-3) are mapped onto the same Priority Queue 32 (e.g. PQ 0), and the priority queue field of the MAC-hs PDU header is replaced by the LCH-ID (here 0, 1, 2, or 3). Thus, the first PQ 32 is identified if the LCH-ID is one out of the aforementioned, configured values.

The mapping of multiple logical channels to a PQ 32 is configured by applications higher in the network protocol stack, such as Radio Resource Control (RRC), NodeB Application Part (NBAP) or Radio Network Subsystem Application Part (RNSAP). These upper layer applications configure the mappings to the NodeB 20 and UE 24. In this example, LCH-ID 4 is configured to be carried over a separate MAC-d flow, and the data may be configured to a separate PQ 32 by upper layer applications.

As described above, one step of this embodiment of the present invention is to configure a mapping from LCH-IDs to PQs 32. This is required at least in the NodeB 20, and is preferably also done in the UE 24, in order to retain the current PQ abstraction layer. The LCH-ID is transmitted over the Iub, for example in the HS-DSCH data frame header, and is thus known per MAC-d PDU. When the HS-DSCH data frame is decoded in the NodeB 20, the MAC-d PDUs are either directed to the correct PQs 32 according to the mapping between the LCH-ID and PQ 32 (i.e., reordering is performed per PQ 32), or alternatively there will be one PQ 32 per LCH. When a MAC-d PDU is taken from a PQ 32 and encapsulated into a MAC-hs PDU in the Node B 20, the LCH-ID is added to the MAC-hs header in lieu of the PQID field.

In the UE 24, if the LCH-ID mapping from PQs 32 has not been configured, the re-ordering of MAC-hs PDUs is done on a per-LCH-ID basis. However, to reduce the number (and hence cost) of re-ordering queues, it would be advantageous to have a mapping between the PQs 32 and the LCH-IDs, which would enable reordering per-PQ 32 instead of per-LCH. The reordering methodology affects the MAC-hs header, since Transmission Sequence Numbers (TSN) need to be assigned per reordering entity.

Figure 5:
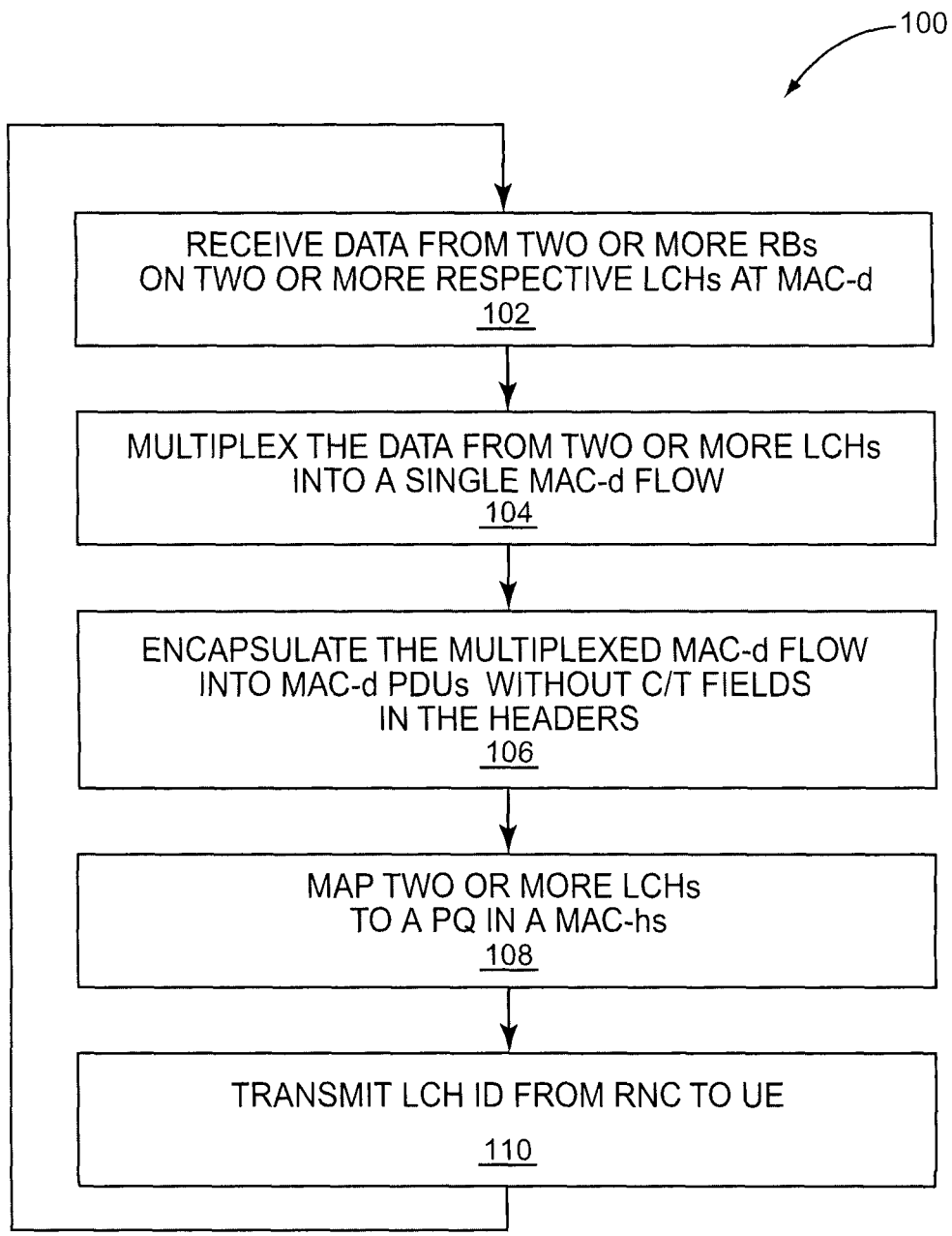
FIG. 5 is a flow diagram of a method of transmitting data without C/T fields.

A method 100 of transmitting data in a UTRAN wireless communication network according to this embodiment of the present invention is depicted in flow diagram form in FIG. 5. Although depicted as successive steps, those of skill in the art will recognize that all method steps need not be performed in the order shown; in particular, the configuration or mapping step may advantageously be performed only once for a given sequence of data transfers to a particular UE 24. Furthermore, those of skill in the art will recognize that the method is ongoing. Nevertheless, for the purposes of discussion, the method "begins" by receiving data from two or more Radio Beacons on two or more respective logical channels at a MAC-d 18 in the RNC 14 (step 102). The MAC-d 18 multiplexes the data from two or more logical channels into a single MAC-d flow (step 104). The MAC-d 18 then encapsulates the multiplexed MAC-d flow into MAC-d PDUs without C/T fields in the PDU headers (block 106). A higher layer application maps the two or more logical channels to a single Priority Queue 32 in a MAC-hs 22 in at least the NodeB 20 (block 108), and preferably additionally in a MAC-ehs in a UE 24. A logical channel identifier is then transmitted from the RNC 14 to the UE 24 (block 110), such as in the HS-DSCH data frame header on the Iub between the RNC 14 and NodeB 20, and in the PQID field of MAC-hs PDUs over the air interface from the NodeB 20 to the UE 24

In this embodiment, the MAC multiplexing structure is retained, the number of MAC-d flows and PQs 32 is limited, and the C/T field is removed from MAC-d PDU headers. This reduces the protocol overhead and results in an octet-alignment of MAC-d PDUs, facilitating the use of a length indicator in Iub and MAC-hs framing protocols.

In another embodiment of the present invention, the C/T field in multiplexed MAC-d PDU headers is retained and the MAC-d PDU is octet-aligned by adding suitable number of padding bits, i.e., (8−n) where n is the number of bits in the C/T field (e.g., 4 for a 4-bit C/T field). This allows an octet-aligned length-indicator to be introduced in the MAC-hs and Iub framing protocols, simplifying processing of the resulting PDUs.

In another embodiment of the present invention, the C/T field in multiplexed MAC-d PDU headers is retained. The Iub framing protocol and MAC-hs protocol include a Length Indicator indicating the length of MAC-d PDUs in bytes. In this embodiment, the transmitting and receiving entities are configured to add the length of the C/T field to the absolute value of the Length Indicator for Logical Channels, MAC-d flows, and PQs 32 for MAC-d PDUs with a C/T field. In this manner, the length of both multiplexed and non-multiplexed MAC-d PDUs can be readily identified with a Length Indicator quantified to bytes. The length offset for MAC-d PDUs with a C/T field is similarly configured by upper layer applications, such as RRC, NBAP, and RNSAP.

Figure 6:
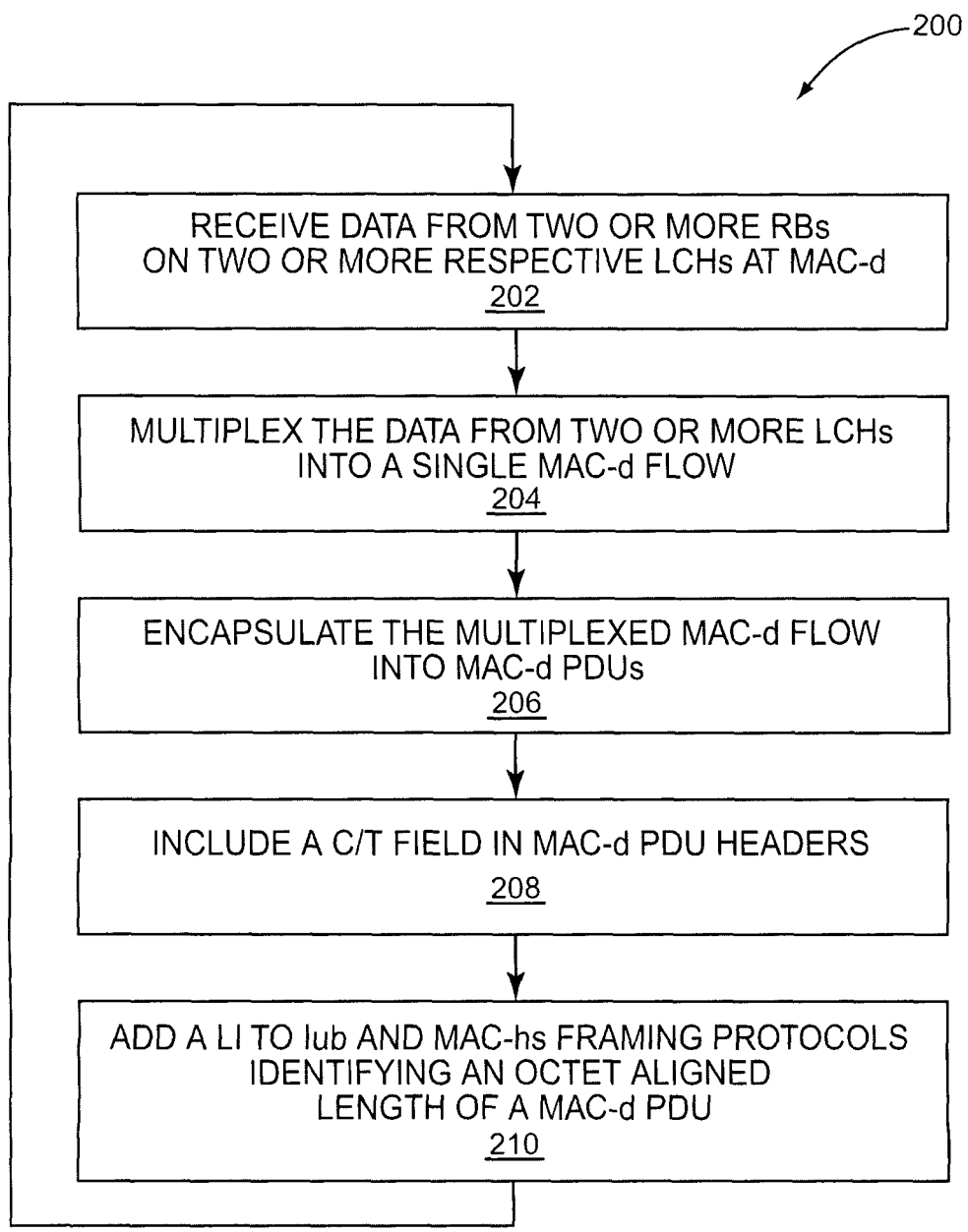
FIG. 6 is a flow diagram of a method of transmitting data with C/T fields.

A method 200 of transmitting data in a UTRAN wireless communication network according to either of these latter two embodiments of the present invention is depicted in flow diagram form in FIG. 6. The method "begins" by receiving data from two or more Radio Beacons on two or more respective logical channels at a MAC-d 18 in the RNC (step 202). The MAC-d 18 multiplexes the data from two or more logical channels into a single MAC-d flow (step 204). The MAC-d 18 then encapsulates the multiplexed MAC-d flow into MAC-d PDUs (step 206). The MAC-d 18 includes a C/T fields in the header of each multiplexed MAC-d PDU (block 208). A length indicator is added to the Iub and MAC-hs framing protocols identifying an octet-aligned length of a MAC-d PDU (step 210). In one embodiment, the length indicator identifies an octet-aligned length of a MAC-d PDU due to the MAC-d performing the further step of padding multiplexed MAC-d PDUs with (8−n) bits, where n is the number of bits in the C/T field. In another embodiment, the length indicator identifies an octet-aligned length of a MAC-d PDU due to higher layer protocol applications configuring the transmitter and receiver (e.g., the MAC-d 18 and MAC-hs 22 or the MAC-hs 22 and UE 24) to include an offset of (8−n) bits to the length indicator, where n is the number of bits in the C/T field.

Embodiments of the present invention allows savings in the number of PQs 32 in the NodeB 20 and in the number of MAC-d flows, and thus in the required number of transport network connections, while enabling efficient octet-aligned length indicators, which reduce framing complexity and conserve network bandwidth. In the embodiment eliminating the C/T field in multiplexed MAC-d PDU headers, air interface resources are additionally conserved by reducing the number of bits necessary to uniquely identify originating logical channels.

Those of skill in the art will recognize that the functional modules described herein, including the RLC 16, MAC-d 18, NodeB MAC-sh 22, and UE MAC-esh may be implemented as dedicated electronic circuits, as software modules executed on a microprocessor or Digital Signal Processor, or in any combination of software, firmware, and hardware known in the art or yet to be developed.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method performed at a Radio Network Controller (RNC) for transmitting data in a wireless communication network that includes at least one NodeB and one or more user equipments (UE), the method comprising:
   receiving data from two or more radio bearers on two or more respective logical channels at a dedicated Medium Access Controller (MAC-d);
   multiplexing the data from the two or more logical channels into a single MAC-d flow;
   encapsulating the multiplexed MAC-d flow into MAC-d Protocol Data Units (PDUs), such that MAC-d PDU headers do not include a C/T field identifying the two or more logical channels;
   mapping the two or more logical channels to a Priority Queue (PQ) in a high speed Medium Access Controller (MAC-hs) of a NodeB; and
   transmitting logical channel identifiers (LCH-ID) from the Radio Network Controller to a UE.

2. The method of claim 1 wherein mapping two or more logical channels to a PQ in a MAC-hs comprises configuring the MAC-hs using a higher protocol layer application.

3. The method of claim 2 wherein the higher protocol layer application is one of a Radio Resource Control (RRC), a NodeB Application Part (NBAP), and a Radio Network Subsystem Application Part (RNSAP).

4. The method of claim 1 further comprising mapping the two or more logical channels to a PQ in a MAC-ehs of a UE.

5. The method of claim 1 wherein transmitting a LCH-ID from a RNC to a UE comprises transmitting the LCH-ID from the RNC to a MAC-hs in a NodeB in a High Speed Downlink Shared Channel (HS-DSCH) data frame header.

6. The method of claim 5 wherein transmitting a LCH-ID from a RNC to a UE further comprises:
replacing a Priority Queue Identifier (PQID) field of a MAC-hs PDU with the LCH-ID; and
transmitting the MAC-hs PDU over an air interface from the NodeB to the UE.

7. A Radio Network Controller (RNC) in a wireless communication network that includes at least one NodeB and one or more user equipments (UE), wherein the NodeB includes a high speed Medium Access Controller (MAC-hs) configured to direct MAC-d flows from the RNC to one or more Priority Queues (PQs), wherein two or more logical channels are mapped to at least one PQ, and to transmit a logical channel identifier (LCH-ID) to a UE, wherein the LCH-ID field of a MAC-ehs PDU identifies the PQ, the RNC comprising:
a dedicated Medium Access Controller (MAC-d) configured to:
receive data from two or more radio bearers on two or more respective logical channels;
multiplex the data from the two or more logical channels into a single MAC-d flow;
encapsulate the multiplexed MAC-d flow into MAC-d Protocol Data Units (PDUs), such that MAC-d PDU headers do not include a C/T field identifying the two or more logical channels; and
transmit logical channel identifiers (LCH-ID) with the multiplexed MAC-d flows to a UE.

8. The Radio Network Controller of claim 7 wherein the MAC-d is further configured to transmit the LCH-ID to the NodeB MAC-hs in a High Speed Downlink Shared Channel (HS-DSCH) data frame header.

9. A NodeB in a wireless communication network that includes at least one Radio Network Controller (RNC) and one or more user equipments (UE), wherein the RNC includes a dedicated Medium Access Controller (MAC-d) configured to receive data from two or more radio bearers on two or more respective logical channels, multiplex the data from the two or more logical channels into a single MAC-d flow, encapsulate the multiplexed MAC-d flow into MAC-d Protocol Data Units (PDUs), such that MAC-d PDU headers do not include a C/T field identifying the two or more logical channels, transmit logical channel identifiers (LCH-ID) with the multiplexed MAC-d flows to a UE, and transmit the LCH-ID to the NodeB MAC-hs in a High Speed Downlink Shared Channel (HS-DSCH) data frame header, the NodeB comprising:
a high speed Medium Access Controller (MAC-hs) configured to direct MAC-d flows from the RNC to one or more Priority Queues (PQs), wherein two or more logical channels are mapped to at least one PQ.

10. The NodeB of claim 9 wherein the MAC-hs is further configured to transmit a LCH-ID to a UE, where an LCH-ID field of a MAC-ehs PDU identifies the priority queue.

11. A method of receiving data at a User Equipment (UE) in a wireless communication network, the method comprising:
receiving data from two or more radio bearers multiplexed into a dedicated Medium Access Controller (MAC-d) flow, and encapsulated into MAC-d Protocol Data units (PDUs) in which MAC-d PDU headers do not include a C/T field identifying the logical channels;
mapping the two or more logical channels to a Priority Queue (PQ) in a high speed Medium Access Controller (MAC-ehs) of the UE; and
receiving logical channel identifiers (LCH-ID) from a Radio Network Controller (RNC).

12. The method of claim 11 wherein mapping the two or more logical channels to a PQ in a MAC-ehs comprises configuring the MAC-ehs using a higher protocol layer application.

13. The method of claim 12 wherein the higher protocol layer application is one of a Radio Resource Control (RRC), a NodeB Application Part (NBAP), and a Radio Network Subsystem Application Part (RNSAP).

14. The method of claim 11 further comprising demultiplexing the data received from the two or more radio bearers in a PQ responsive to the received LCH-ID.

15. The method of claim 11 wherein receiving a LCH-ID from a RNC comprises receiving the LCH-ID in a priority Queue Identifier (PQID) field of a MAC-hs PDU.

16. A User Equipment (UE) configured to receive data in a wireless communication network, the UE comprising:
a receiver front-end configured to receive radio signals and convert the received signals to a baseband data representation; and
a high-speed Medium Access Controller (MAC-ehs) configured to receive data from the receiver front-end, the data originating from two or more radio bearers and multiplexed into a single dedicated Medium Access Controller (MAC-d) flow and encapsulated into MAC-d Protocol Data Units (PDUs), in which MAC-d PDU headers do not include a C/T field, and further encapsulated into MAC-hs PDUs including an indication of a logical channel identifier (LCH-ID), the MAC-ehs further configured to demultiplex the MAC-hs PDUs based on the LCH-ID.

17. The UE of claim 16 wherein the UE is configured to receive data on a High Speed Downlink Shared Channel (HSDSCH).

18. The UE of claim 16 wherein the MAC-ehs is further configured to re-order received data based on the LCH-ID.

19. The UE of claim 16 wherein two or more logical channels are mapped to a Priority Queue (PQ) by a higher protocol layer application.

20. The UE of claim 19 wherein the higher protocol layer application is one of a Radio Resource Control (RRC), a NodeB Application Part (NBAP), and a Radio Network Subsystem Application Part (RNSAP).

* * * * *

UNITED STATES PATENT AND TRADEMARK OFFICE
CERTIFICATE OF CORRECTION

PATENT NO.        : 8,467,421 B2                                     Page 1 of 1
APPLICATION NO.   : 12/519333
DATED             : June 18, 2013
INVENTOR(S)       : Larmo et al.

It is certified that error appears in the above-identified patent and that said Letters Patent is hereby corrected as shown below:

In the Specification

In Column 1, Lines 25-26, delete "Radio Link Protocol (RLC)" and insert -- Radio Link Control (RLC) --, therefor.

In Column 2, Line 31, delete "and" and insert -- an --, therefor.

In Column 5, Line 30, delete "UE 24" and insert -- UE 24. --, therefor.

In Column 5, Line 63, delete "RNC" and insert -- RNC 14 --, therefor.

In Column 6, Line 26, delete "MAC-sh" and insert -- MAC-hs --, therefor.

Signed and Sealed this
Thirty-first Day of December, 2013

Margaret A. Focarino
*Commissioner for Patents of the United States Patent and Trademark Office*